United States Patent [19]

Hashimoto

[11] Patent Number: 4,876,707

[45] Date of Patent: Oct. 24, 1989

[54] TWO-DIRECTIONAL CALL FORWARDING DEVICE

[75] Inventor: Kazuo Hashimoto, Tokyo, Japan

[73] Assignee: Hashimoto Corporation, Tokyo, Japan

[21] Appl. No.: 183,532

[22] Filed: Apr. 14, 1988

[30] Foreign Application Priority Data

Apr. 14, 1988 [JP] Japan .................................. 62-91377

[51] Int. Cl.⁴ ...................... H04M 1/57; H04M 1/64; H04M 11/00
[52] U.S. Cl. ...................................... 379/57; 379/67; 379/88; 379/211
[58] Field of Search ....................... 379/211, 57, 67, 88

[56] References Cited

U.S. PATENT DOCUMENTS 4,263,480  4/1981  Levine .................................. 379/57
4,674,115  6/1987  Kaleita et al. ....................... 379/201

FOREIGN PATENT DOCUMENTS 2533386  3/1984  France ................................ 379/211
0137763  10/1981  Japan ................................... 379/211
0076940  5/1982  Japan .................................... 379/57

Primary Examiner—Thomas W. Brown
Attorney, Agent, or Firm—Lowe, Price, LeBlanc, Becker & Shur

[57] ABSTRACT

According to conventional telephone call forwarding devices, after a party at a telephone set A calls a party at a set B, a set C calls set D to forward the call, and when set D responds to set C, an alternate loop is formed between A and D. In some of said conventional devices, even when a general calling party calls set C, set B can autodial set A whose telephone number was memorized. However, nothing else can happen if set A doesn't answer the call after automatic dialing. The present invention makes it possible to store a plurality of telephone numbers of telephone sets of calling parties, A, A-1, A-2, A-3 ... and automatically and successively to dial the stored telephone numbers of A-1, A-2, A-3 ... even when A doesn't answer the call, so that the highly practical effectiveness can be obtained.

4 Claims, 4 Drawing Sheets

TWO-DIRECTIONAL CALL FORWARDING DEVICE

TECHNICAL FIELD

The present invention relates to a telephone call forwarding device.

BACKGROUND ART

A conventional two-directional call forwarding device is disclosed in Japanese S49-13087 82 filed by the applicant hereof.

According to said prior art, when a telephone set A calls set B, a set C calls set D to forward the call. When D responds to C, a loop is formed between A and D. In said prior art, even when a general calling party calls C, B can autodial set A, whose telephone number was memorized. However, a tape is used as a recording medium for automatic dialing of telephone numbers in the conventional device, and only one telephone number of the calling party A, which number is memorized, can be called. Thus, nothing further can happen if A doesn't answer the call after the automatic dialing.

DISCLOSURE OF THE INVENTION

It is an object of the present invention to make it possible to store a plurality of telephone numbers of calling parties, A, A-1, A-2, A-3 ... and to automatically and successively dial the stored telephone numbers even when one of the numbers A-1, A-2, A-3 ... doesn't answer.

BRIEF DESCRIPTION OF THE DRAWINGS

FIGS. 1-2 shows a detailed view, showing a detail of Figure 1—1.

FIGS. 2, 3, and 4 are flow charts showing the operation of this invention.

BEST MODE FOR CARRYING OUT THE INVENTION

The arrangement and operations in the preferred embodiment of the present invention will now be described. In the FIG. 1—1, A refers to the telephone set of the calling party initiating the communication, from a location which is unsettled.

B identifies the telephone set for receiving the call. When a paging call is received from A and the present device is set to the paging mode, B becomes the telephone set for sending the paging call.

C refers to a telephone set for forwarding the call, when the signal is sent from A and the present device is set to forwarding mode. Under such conditions, C typically calls a telephone set D, which is set at a specific location, by a speed dialer. When the present device is set to a paging mode, C calls the pager E. When the party carrying the pocket-bell (pager) E calls C via a nearby telephone, C is used as the telephone set for receiving the call.

Figure 1:
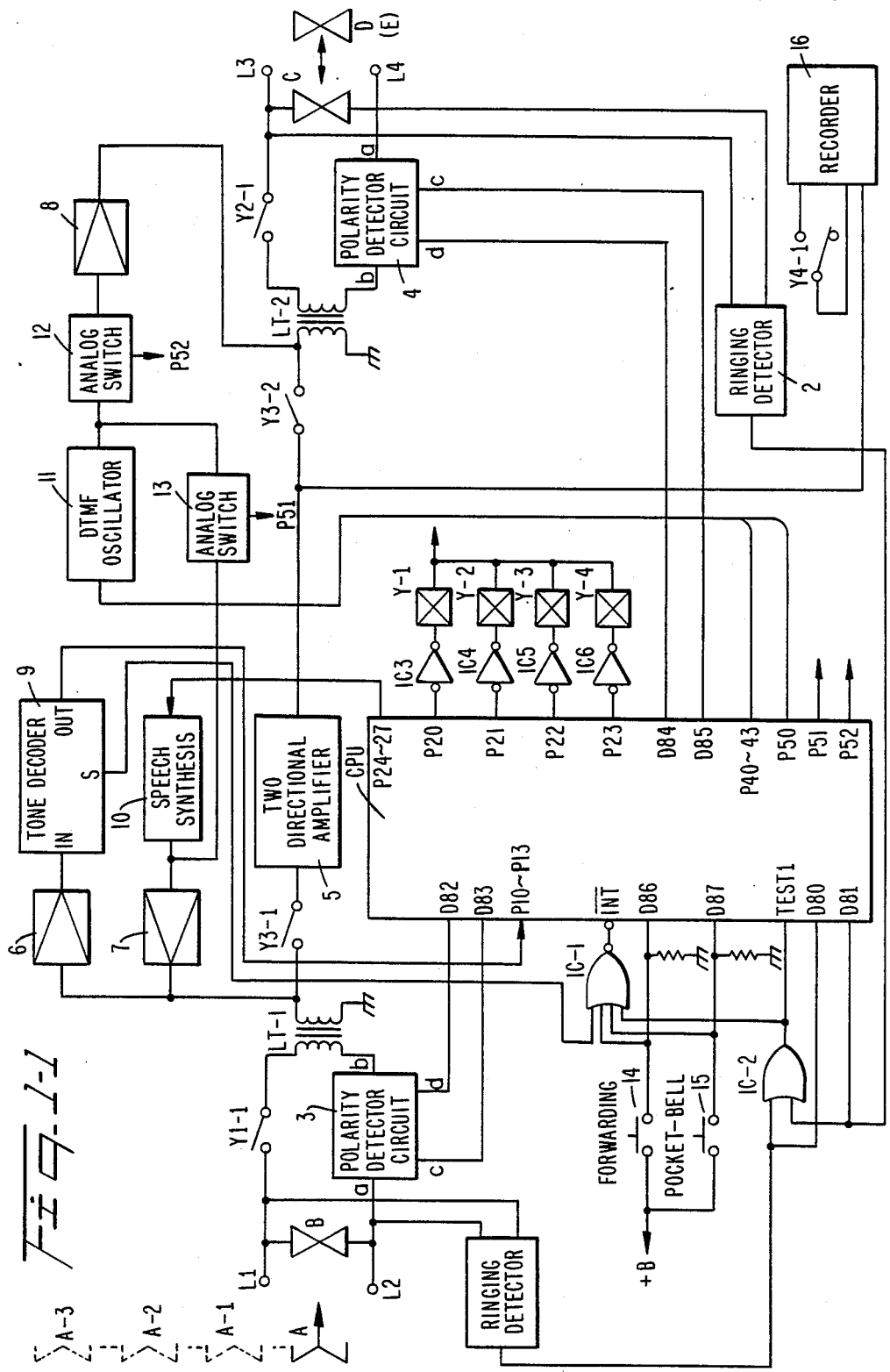
FIG. 1—1 is a principle view of the preferred embodiment of this invention.
Figure 2:
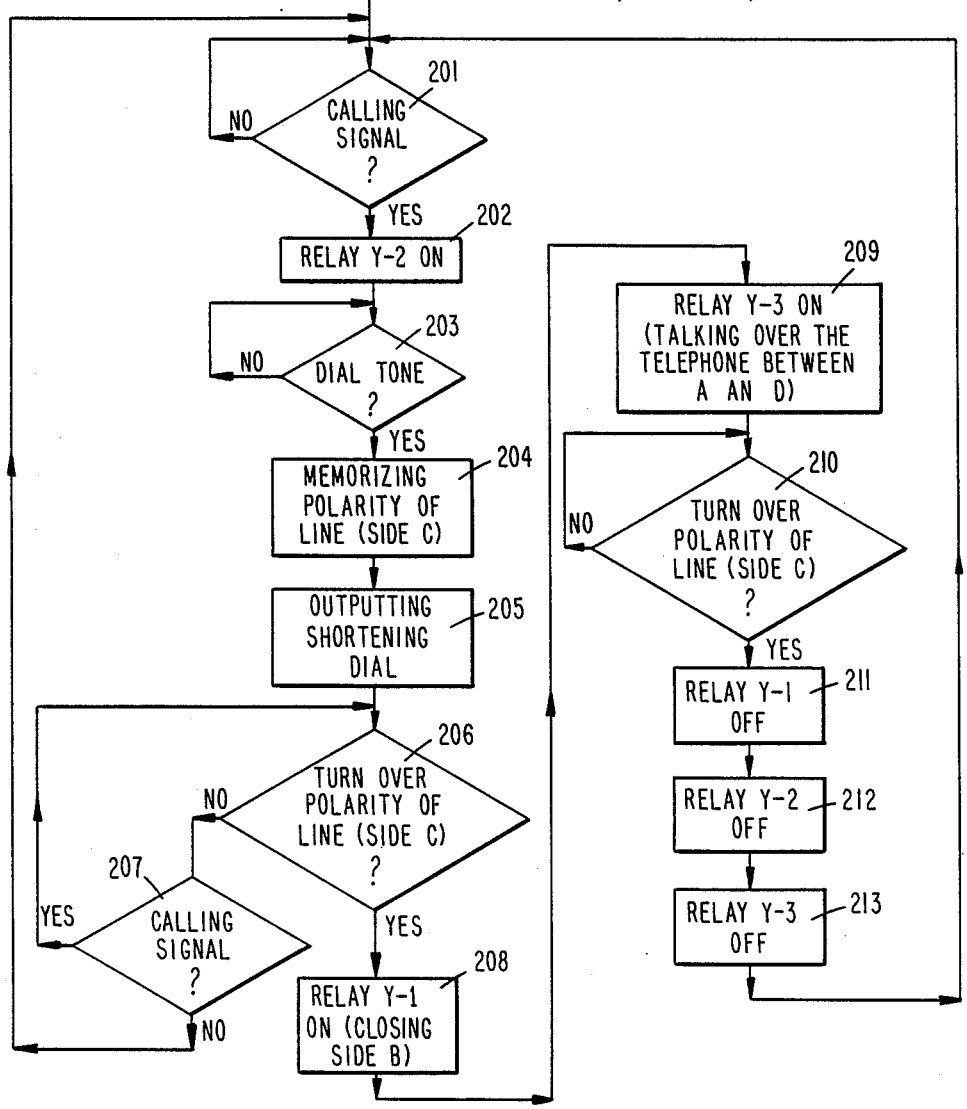
Figures 1, 2:
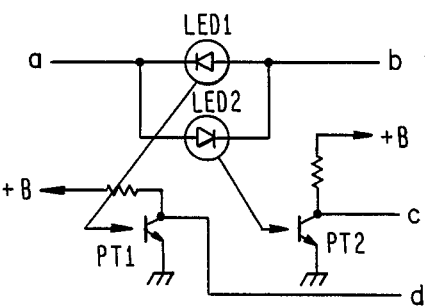

Reference symbols LT-1 and LT-2 denote line transformers. Reference numerals 1 and 2 denote ringing circuits for detecting a ringing signal; and reference numerals 3 and 4 denote polarity detecting circuits for detecting a polarity reversal of the telephone line. As shown in FIG. 1-2, the polarity detecting circuits include two light-emitting diodes, connected to each other in parallel and in opposite direction, and two photocouplers PT1 and PT2 for receiving the outputs from said light-emitting diodes. The outputs of the two polarity detecting circuits are provided to input terminals DB2 to DB5 of a CPU.

The polarities detected by circuits 3 and 4 are memorized and the polarity reversion is detected by the program of CPU, as hereinafter described.

Reference numeral 5 denotes a two-directional amplifier for increasing the volume of a voice signal transmitted between A and D (B) to a suitable level. Reference symbols 6 to 8 denote one-directional amplifiers; and 9 denotes a tone decoder for decoding the telephone number of said calling party A, sent from A by dialing a pushbutton (tone) phone. Reference numeral 10 denotes a voice synthesizer for sending out by synthesized voice an outgoing message and an instruction to said calling party, and 11 denotes the speed dialer which sends the signal for calling D from C. Alternatively or equivalently, reference numeral 11 may be considered to denote the DTMF oscillator which changes the telephone number to multiple frequency dialing tones generated by a push phone. Reference numerals 12 and 13 denote analog switches for switching the output of said tone to C or to B; and 14 and 15 denote operation switches for switching the operation of the present device to call forwarding or to paging.

Reference symbol IC-1 denotes a NOR gate; IC-2 denotes an OR gate; IC3 to IC6 denote drivers; and Y-1 to Y-4 denote relays whose contacts are shown in corresponding lower-case letters. For example, contact y1-1 corresponds to relay Y-1. Reference symbol CPU denotes a one chip microcomputer, for instance, INTEL 8049, wherein DB0 to DB7 and TEST1 are input terminals, INT is an interrupt terminal, P10 to P13 are input terminals and P20 to P27, P40 to P43, and P50 to P52 are output terminals. Each of the above components is connected to the various input terminals or output terminals of the CPU for operations shown in the flow charts of FIGS. 2 to 4.

Figure 3:
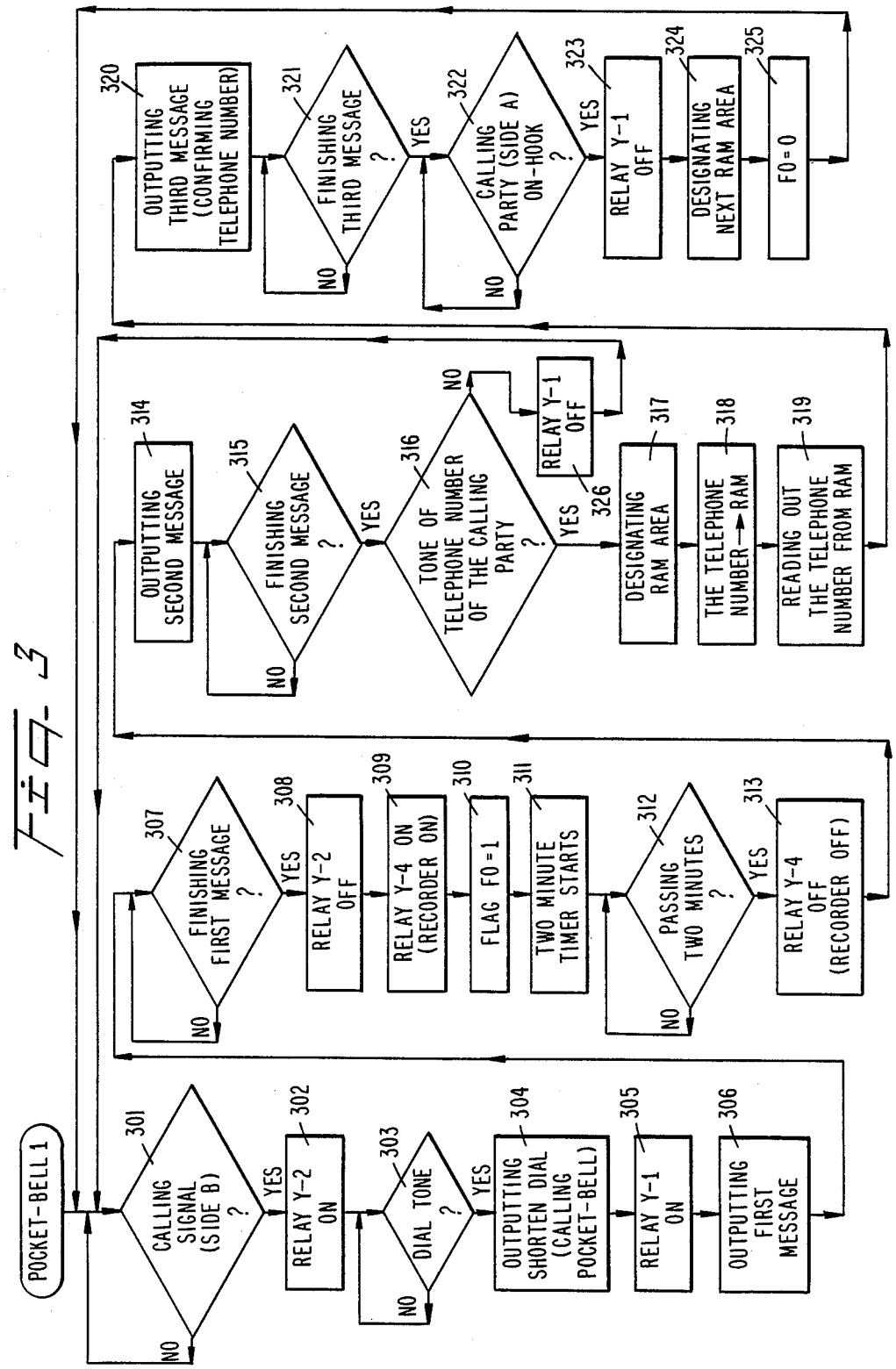

Operations of the present device will now be described with reference to the flow charts shown in FIGS. 2 to 4.

The flow chart of FIG. 2 shows the operation for forwarding to D an incoming call from the calling party A received at the present device. Upon receiving an incoming call from A to B, a ringing signal is detected by the ringing circuit 1. The output of ringing circuit 1 is introduced into the input terminal TEST1 of the CPU through the OR gate IC-2. When it is determined by the program that the input signal is a ringing signal (step 201), output port P21 is switched to L (low) level from H (high) level and the relay Y-2 is kept energized through the driver IC-4 (step 202). The telephone set C is engaged by the contact y2-1 of then relay Y-2 through the line transformer LT-2 and a dial tone is received from the central office. When the dial tone is detected (step 203), the line polarity at that time is memorized (step 204). More particularly, when the telephone set C is engaged, the engaging current flows through the polarity detecting circuit 4 in a direction corresponding to the polarity thereof. For instance, when L3 is (+) and L4 is (−), the current flows through LED1 and not through LED2, as shown in FIG. 1-2. Accordingly, in response to the illumination output of LED1, photo transistor PT1 is energized and photo transistor PT2 is not energized. Thus, an output terminal d is at the L level and an output terminal c is at the H level. The output status of circuit 4 is stored into a register or a RAM in the CPU through the input terminals DB4 and DB5 of the CPU. For example, the status is stored as a hexadecimal code "01" into a register R7 of the CPU.

Next, the speed dialing operation is carried out so as to call the telephone set D (step 205). More particularly, in order to send a "*" tone first, a predetermined code is output from the output ports P40 to P43 of the CPU. The address of the DTMF oscillator 11 is set, and the start pulse is output from the output port P50. In response to said output, the "*" tone is output for about 0.5 second from the DTMF oscillator 11. This tone is amplified by the amplifier 8 through the analog switch 12 (the output port P52 is preset to H level) and sent out to the telephone line through the line transformer LT-2. Similarly, a "0" tone is sent out twice after a minimum pause, so that the speed dialing sequence "*00" is completed.

When telephone set D answers the call, the line polarity is reversed according to the response of D (step 206). The line polarity reversion is detected by comparison with the hexadecimal code "01" stored in register R7. When the polarity reversion is detected, the stored code is switched, for instance, to hexadecimal "10".

When D answers, the output port P20 is switched to L level from H level, and the relay Y-1 is kept energized through the driver IC-3. Thus, the telephone set B is engaged through the contact y1-1 of the relay Y-1 (step 208). Accordingly, a loop is formed between the calling party A and the telephone B.

Further, the relay Y-3 is kept energized in step 209, so the calling party A and the called party D can talk with each other through the contact y3-1 and the two-directional amplifier 5.

After the conversation, when the called party D hangs up, the line polarity of the telephone C is reversed. When this polarity reversion is detected as described above (step 210), the relays Y-1, Y-2 and Y-3 are deenergized (steps 211 to 213). The present device thus returns to the standby mode. It is also possible to keep the relay Y-4 energized and drive the recorder 16 by the contact y4-1 thereof during the conversation so as to record the two-way conversation.

On the other hand, when the called party D does not answer, a loop in the program is formed from step 206 to step 207. In step 207, the ringing signal is detected through the ringing circuit 1. When the calling party A stops calling, the program returns to step 201 and the present device returns to the standby mode to be ready for a next incoming call.

When the changeover switch 15 (paging) is pushed, upon receiving a signal the present device performs a paging operation of a portable paging unit. Namely, in the flow chart of FIG. 3, when the device receives the signal, the relay Y-2 is kept in an ON condition, and the connection to telephone set C is closed by the contact y2-1. When the dial tone is detected, the speed dialing code for calling the paging unit is output (steps 301–304). This speed dialing code is set, for example, to "*03", which is different from the code for call forwarding.

After the speed dialing code is output, the relay Y-1 is set to an ON condition and the connection to telephone set B is closed. As a result, the calling signal stops, and the connection between sets A and B is established to permit communication over the telephone (step 305). At the same time, a first message is output by the speech synthesis section 10. Specifically, the first message is selected by the output ports P24 - P26 from the messages memorized in the speech synthesis section 10. The first message can be output by adding the start pulse from the output port P27. Accordingly, the first message is amplified by the amplifier 7, and is forwarded to the calling party A. This first message may be, for example, "This device is calling the pocket bell now, please wait for a minute."

In the step 308, calling of the pocket-bell (portable pager) from the terminal has been finished. Accordingly, in order to free telephone set C, the relay Y-2 is set to an OFF condition. This operation is necessary so that the party carrying the pocket-bell calls the side C in response to the received call. In the step 309, the relay Y-4 is set to an ON condition and the recorder 16 is operated. This operation in step 309 is provided for the calling party who thinks it enough only to leave a message on the recorder without talking directly with the carrier of the pocket-bell. A message identifying the contents which may be recorded is included in the first message. As above, when the recorder starts operating, after a flag F0 is set to "1", a two minute timer starts, and it is tested whether or not the two minutes have passed (step 310, 311). If the called pocket-bell carrier can call the set C via the telephone E within two minutes, the paged party can talk with the calling party directly. This operation is shown in the flow chart of the FIG. 4, and is explained later.

When the period of two minutes passes, the relay Y-4 is set to OFF and stops the recorder 16, and a second message is output from the speech synthesis section 10 (steps 313, 314). This second message may be, for example, "The pocket-bell carrier cannot be reached. If you are in a hurry, please dial your telephone number, and the pocket-bell carrier will call you later."

When the calling party at A then starts dialing its own telephone number by the pushphone within a specified time, the head of tone of the pushphone is detected in the step 316. When the head of tone is detected, a specific RAM area is designated. The telephone number thus forwarded from the calling party is memorized in the RAM area (steps 317, 318).

Specifically, the telephone number forwarded from the calling party is amplified by the amplifier 6 through the line transformer LT-1, and is provided to the tone decoder 9. Accordingly, the tones representing the telephone number are output as 4 bit codes from the output terminal OUT of the tone decoder 9. This output is provided to the input terminals P10–P13 of the CPU. When a strobe signal from the strobe terminal S of the tone decoder 9 is input to the interrupt terminal INT through the NOR gate IC-1, the code is memorized in the RAM. This operation is performed on all digits of the telephone number. Thereafter, the memorized telephone number is read out from the RAM, and is heard for confirmation by the calling party at A (step 319).

In step 320, a third message is output. The telephone number memorized as above is confirmed by the third message and, at the same time, if the telephone number is wrong, the telephone number is dialed again by the calling party. The telephone number dialed again is sent to the step 318 by the interrupting operation.

When the calling party goes on-hook after finishing talking over the telephone, the on-hook condition is detected in step 322. This detection is achieved by reducing light of the light emitting diode in the polarity detecting circuit 3. After the relay Y-1 is set to OFF, the connection of the set B is released. The next RAM area is designated, and when the calling party has set to the on-hook condition, the flag F0 is cleared and the telephone line is restored.

Figure 4:
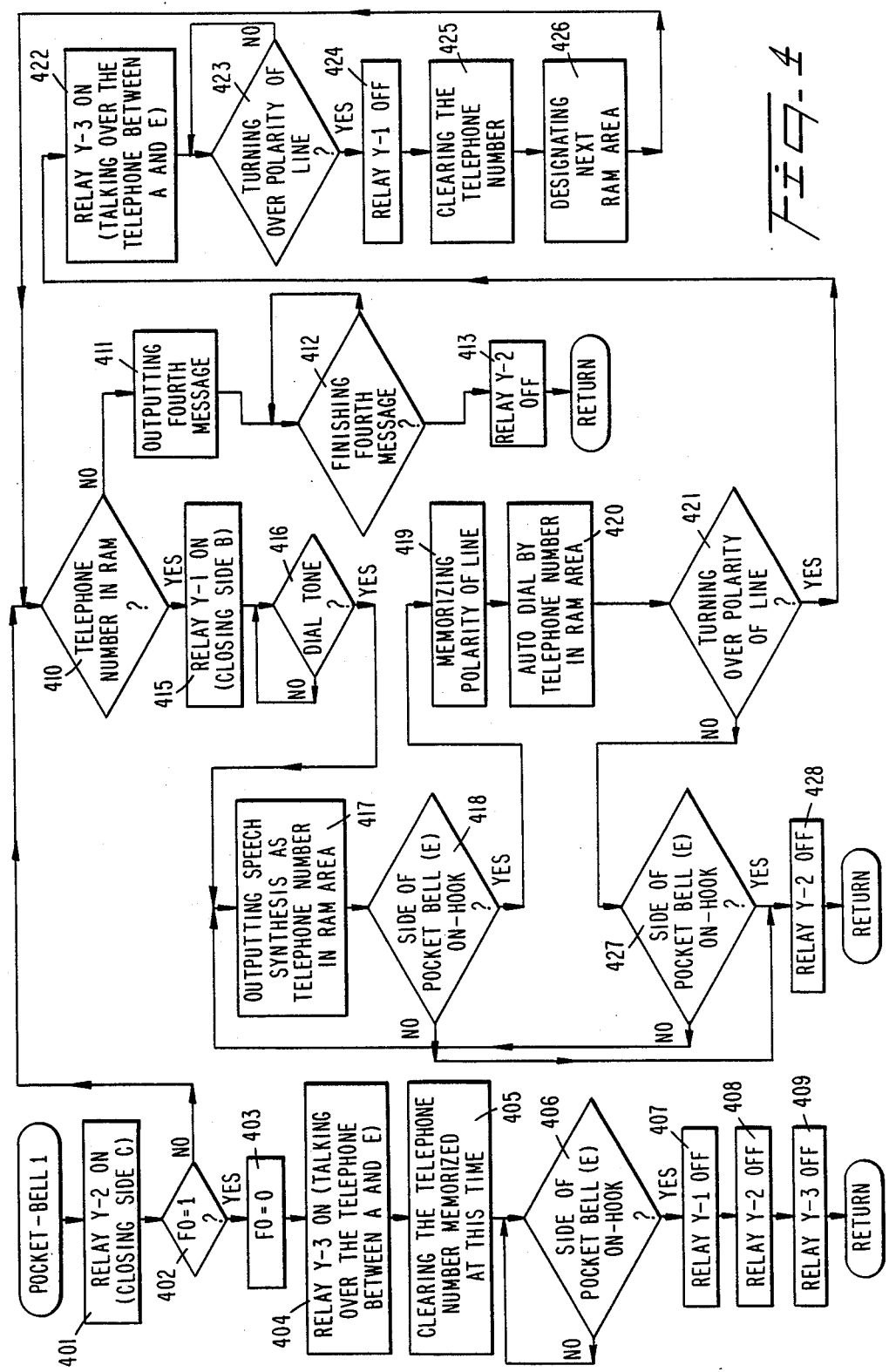

The flow chart of FIG. 4 shows the sequence of operations when the paged pocket-bell carrier calls the set C. Namely, when the pocket-bell carrier calls telephone set C by the nearest telephone, the calling signal is detected by the ringing circuit 2, and is provided to the input terminal TEST 1 of the CPU through the OR gate IC-2. At the same time, the signal is given to the interrupt terminal INT through the NOR gate IC-1. As a result, an interruption occurs, and the program shifts to the flow chart shown in FIG. 4. Accordingly, in step 401, the relay Y-2 is set to ON and closes connection to the set C through the contact y2-2. In the step 402, a test is performed for the flag F0 shown in figure 3. When the calling party is in an on-hook condition and is talking over the telephone, the flag F0 is "1". As a result, the flow chart flows to the step 403. When the calling party is not talking over the telephone, the flow chart flows to the step 410. When the calling party is on-hook, and in the process of talking over the telephone, in the step 403, after the said flag F0 is cleared, the relay Y-3 is set to ON, to establish contact between the calling party at A and the pocket-bell carrier, to enable talking over the telephone (step 404).

At this time in the step 318, the telephone number memorized in the RAM is not necessary. If it is memorized in the RAM, it is cleared (step 405) and, in the step 406, the on-hook condition of the pocket-bell set is detected. When it is detected that the telephone set used by the pocket-bell carrier is onhook, the relays Y-1, Y-2 and Y-3 are set to OFF, and the program returns to the waiting condition of the step 301, which is not shown in the Figure.

When the calling party at A has already returned to the on-hook condition, even if the called pocket-bell carrier calls the side C, the program shifts from the step 402 to the step 410 as above. In the step 410, it is tested whether the telephone number is memorized or not, by detecting the RAM area which memorizes the said telephone number. If the telephone number is not memorized, the program flows to the step 411 to output a fourth message. After the fourth message is sent, which may be, for example, "The telephone number is not memorized", the relay Y-2 is set to OFF (step 413), and the telephone line is restored.

When the telephone number is memorized, in the step 415 the relay Y-1 is set to ON, and contact is established to the side B by closing contact y1-1. After the closing, a test is performed for presence of the dial tone sent from the terminal (step 416). The address of the telephone number recorded in the RAM as above, is read out, the telephone number is changed to the speech synthesized form, as in steps 319 and 320, and is sent to the calling party at E. More particularly, the telephone number, as memorized in the RAM in the CPU, is output from the output port P24–P27 digit by digit, and is changed by the speech synthesis section 10 to an analog speech synthesis signal. The analog signal representing the speech synthesized number is sent to the calling party through the analog switch 13, the analog switch 12, the amplifier 8, and the line transformer LT-2.

When the calling party, who confirms the synthesized telephone number which will be dialed automatically, thinks it acceptable to auto dial the telephone number, he leaves the dialing to this device. When the calling party thinks it inappropriate to call the other party now, the telephone is set to on-hook. As a result, the program shifts from the step 418 to the step 428, the relay Y-2 is set to OFF, and the device is restored Alternatively, at this time, for example, the calling party at set E may push the key "*" on the pushphone twice, to eliminate the telephone number. As a result, the next telephone number is read out from the RAM, and it is possible to auto dial the telephone number as provided in the following explanation (not shown).

When the auto dialing process is practiced, the program shifts to the step 419 through step 417 and step 418. After the line polarity at this time is memorized, the auto dialing is performed according to the telephone number memorized in the RAM, and the set A is called. When the side A responds, the line polarity reverses (step 421), the relay Y-3 is set to ON, and the connection between the side A and the pocket-bell carrier (the side E) is set to permit talking over the telephone.

When the telephone conversation is finished, the set A is set to the on-hook condition, and the line polarity reverses. This operation is detected by the step 421, the relay Y-1 is set to OFF, the set B is released, and the telephone number used for auto dialing is cleared (steps 424 and 425). In the step 426, after the next RAM area which memorizes the next telephone number is designated, the program returns to the step 410.

Accordingly, as described above, the device of the invention continues the auto dialing procedure to call the side A until all the telephone numbers are cleared in the RAM. It is possible to auto dial the next telephone number of the calling party at set A2 by skipping (jumping over) the telephone number, if the set A1 does not respond during the specific time provided therefor.

This invention does not use tape storage of the numbers but, instead, uses solid state memory as the memory medium. As a result, it is possible to call and to dial the information memorized in the solid state memory, automatically and easily, during a short time. Thus, the device owner at set C calls a party at set A through set D. Even if the party at A does not respond thereto, this invention can correspond therewith at once, by calling a number of a next set at which the party may be located, and the practical effect of the present forwarding device is increased.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A tow-directional call forwarding device for receiving at a telephone set B incoming calls from general calling parties at telephone sets A, A-1, A-2, A-3 . . . , and through a telephone set C, dialing a number of a called party at a telephone set D or initiating paging of a pocket bell carrier set E, comprising:
   a memory:

means for successively storing into said memory telephone numbers of set A-1, A-2, A-3, . . . , when the called party at set D does not answer the calls sent by the telephone sets of said calling parties;

means for engaging the telephone B when the called party at set D or at the pocket bell carrier set at E calls the telephone C thereafter, reading out successively a plurality of said telephone numbers stored in said memory, and for automatically and successively dialing said telephone numbers of said sets A, A-1, A-2, A-3 . . . for placing calls thereto through the telephone set B after each call to said set A, A-1, A-2, A-3 . . . is completed; and means for forming a loop between said set D and a particular one of said telephone sets A-1, A-2, A-3, when said set A answers a call from set D to the particular set A-1, A-2, A-3, through the telephone set B.

2. A two-directional call forwarding device, according to claim 1, further comprising means for sending out outgoing messages with instructions to the calling parties, and storing into the memory the telephone number of each calling party which is sent by said each calling party when the called party at set D cannot answer the call, wherein said called party at set D calls the telephone set C, a first one of the telephone numbers (set A) stored into said memory is read out to be automatically dialed, and after the conversation, a next one of the telephone numbers (set A-1) is read out, so as to successively repeat the automatic dialing.

3. A two-directional call forwarding device, according to claim 1, comprising a selection switch for selecting between calling of said called party at set D and calling of said pocket bell carrier set E.

4. A two-directional call forwarding device, according to claim 1, comprising a switch means for successively switching to the automatic dialing sending operation of sets A-1, A-2, A-3 . . . if said calling party at set A doesn't answer when said called party at set D or at said pocket bell carrier set E calls back said calling party at set A.

* * * * *